US008200949B1

(12) United States Patent
Tarjan et al.

(10) Patent No.: US 8,200,949 B1
(45) Date of Patent: Jun. 12, 2012

(54) POLICY BASED ALLOCATION OF REGISTER FILE CACHE TO THREADS IN MULTI-THREADED PROCESSOR

(75) Inventors: David Tarjan, Charlottesville, VA (US); Kevin Skadron, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 60 days.

(21) Appl. No.: 12/331,069

(22) Filed: Dec. 9, 2008

(51) Int. Cl.
  *G06F 9/50* (2006.01)
(52) U.S. Cl. .................. 712/225; 711/118; 718/104
(58) Field of Classification Search .................. None
  See application file for complete search history.

(56) References Cited

U.S. PATENT DOCUMENTS

| | | | | |
|---|---|---|---|---|
| 5,956,747 | A * | 9/1999 | Wilhelm et al. | 711/140 |
| 7,171,545 | B2 * | 1/2007 | Devale et al. | 712/217 |
| 7,418,551 | B2 * | 8/2008 | DeVale et al. | 711/118 |
| 7,539,879 | B2 | 5/2009 | Terechko et al. | |
| 7,743,238 | B2 * | 6/2010 | Biles | 712/239 |
| 8,078,844 | B1 | 12/2011 | Tarjan et al. | |
| 2005/0138297 | A1 * | 6/2005 | Sodani et al. | 711/143 |
| 2006/0168463 | A1 | 7/2006 | Terechko et al. | |
| 2007/0083735 | A1 * | 4/2007 | Glew | 712/214 |
| 2009/0292892 | A1 | 11/2009 | Abernathy et al. | |
| 2009/0292977 | A1 * | 11/2009 | Bradley et al. | 714/807 |
| 2010/0161948 | A1 * | 6/2010 | Abdallah | 712/228 |

OTHER PUBLICATIONS

H. Zeng and K. Ghose. "Register File Caching for Energy Efficiency." Proc. of the 2006 ACM/IEEE Int'l Symp. on Low Power Electronics and Design (ISLPED), pp. 244-249, Oct. 2006.
D. Ponomarcv, K. Kucuk, 0. Ergin, and K. Ghose. "Reducing Datapath Energy through the Isolation of Short-Lived Operands." In Proc. of the 12th ACM/IEEE/IFIP Int'l Conf. on Parallel Architectures and Compilation Techniques (PACT), pp. 258-268, Sep. 2003.
Butts, J.A. and Sohi, G. S., "Use-Based Register Caching with Decoupled Indexing", In. Proc. ACM/IEEE Int'l Symposium on Computer Architecture (ISCA), pp. 302, Jun. 2004.
Notice of Allowance from U.S. Appl. No. 12/331,233, dated May 11, 2011.
Non-Final Office Action from U.S. Appl. No. 12/331,233, dated Jan. 24, 2011.

* cited by examiner

*Primary Examiner* — Kenneth Kim
(74) *Attorney, Agent, or Firm* — Zilka-Kotab, PC

(57) ABSTRACT

A multi-threaded processor system, method, and computer program product capable of utilizing a register file cache are provided for simultaneously processing a plurality of threads. A processor capable of simultaneously processing a plurality of threads is provided. The processor includes a register file and a register file cache in communication with the register file.

20 Claims, 6 Drawing Sheets

POLICY BASED ALLOCATION OF REGISTER FILE CACHE TO THREADS IN MULTI-THREADED PROCESSOR

FIELD OF THE INVENTION

The present invention relates to register file cache, and more particularly to using register file caches for efficient data storage and retrieval.

BACKGROUND

In the context of computer architectures, a processor register refers to memory available on a processor, where contents in the memory may be accessed more quickly than memory available elsewhere. Modern computer architectures typically function by transferring data from main memory into registers, operating on the data in the registers, and then moving the result back into main memory. A register file refers to an array of processor registers in a processor.

Conserving the power utilized by processors is one way of maximizing the efficiency and performance of the processor. To date, register files and scheduling logic are major sources of power loss (i.e. leakage) in a processor. Furthermore, large register files of current processors consume a significant amount of the overall power budget of a chip where the processor is located.

Additionally, as processors grow in capacity, register file capacity included with such processors also grow. With future scaling trends ensuring that register file capacities will continue to increase, register file power will be an ever larger fraction of the overall power of the whole processor. There is thus a need for addressing these and/or other issues associated with the prior art.

SUMMARY

A multi-threaded processor system, method, and computer program product capable of utilizing a register file cache are provided for simultaneously processing a plurality of threads. A processor capable of simultaneously processing a plurality of threads is provided. The processor includes a register file and a register file cache in communication with the register file.

DETAILED DESCRIPTION

Figure 1:
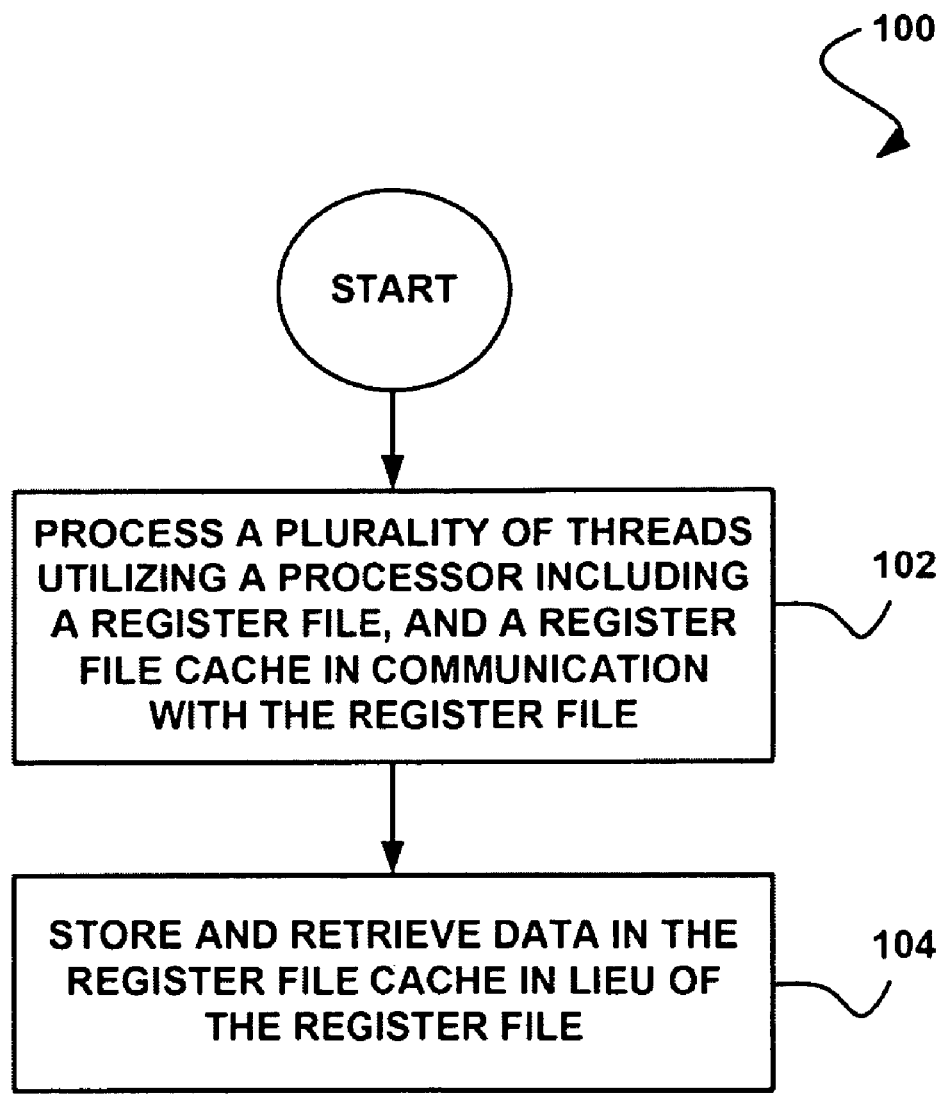
FIG. 1 shows a method for simultaneously processing a plurality of threads, in accordance with one embodiment.

FIG. 1 shows a method 100 for simultaneously processing a plurality of threads, in accordance with one embodiment. As shown, a plurality of threads are processed utilizing a processor including a register file and a register file cache in communication with the register file. See operation 102.

The processor may include any processor capable of simultaneously processing a plurality of threads. For example, in various embodiments, the processor may include a general-purpose central processing unit (CPU), a graphics processor, a micro-controller, a digital signal processor (DSP), a signal processor, a graphics processor and one or more CPUs on the same chip, a network processor, etc. Additionally, in the context of the present description, a register file cache refers to any structure (e.g. a buffer structure, memory, etc.) capable of storing contents or a subset of contents of the registers named by the compiled software. Furthermore, a register file refers to an array of processor registers.

As shown further in FIG. 1, the processor may store and retrieve data in a register file cache in lieu of the register file. See operation 104. In this case, the data stored in the register file cache may include any subset of data stored in the register file.

Furthermore, the register file cache and the register file may be configured such that data may be but need not be communicated between the resister file cache and the register file by the processor. For example, the processor may store first data in the register file cache or bypass the register file cache and write to the register file. The processor may then copy the first data from the register file cache to the register file and retrieve the first data from the register file. Additionally, the processor may store second data in the register file cache, retrieve the second data from the register file cache, and delete the second data from the register file cache before the second data is copied from the register file cache to the register file.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
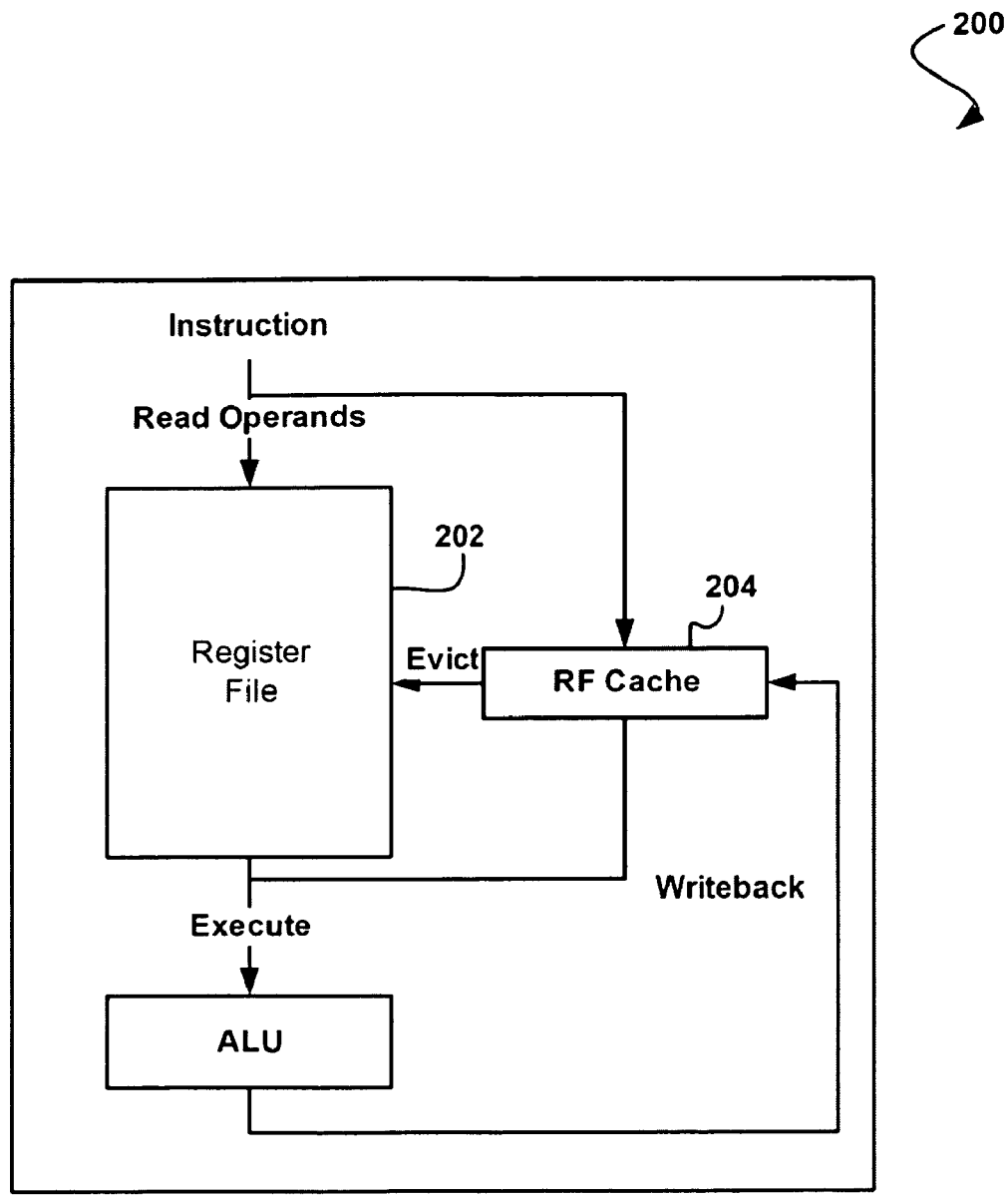
FIG. 2 shows a multi-threaded processor system for simultaneously processing a plurality of threads, in accordance with one embodiment.

FIG. 2 shows a multi-threaded processor system 200 for simultaneously processing a plurality of threads, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description. It should also be noted that, in the context of FIG. 2, multiple threads may share the same register file.

As shown, the processor 200 includes a register file 202 and a register file cache 204 in communication with the register file 202. In operation, the processor 202 is operable to store and retrieve data in the register file cache 204 in lieu of the register file 202.

In this case, the register file cache 204 may include a buffer structure that tries to capture a subset of the contents of the register file 202. Instructions that read input operands may read the operands from the small register file cache 204 instead of the large register file 202. By reading the operands from the small register file cache 204, energy expended by reading from the large register file 202 may be conserved for each such instruction.

In one embodiment, the register file cache 204 may be utilized to store the most utilized and/or the most useful values to maximize a fraction of all operands that may be read from the register file cache 204 as opposed to the register file 202. As an option, data may be stored in the register file cache

204 based on heuristics. In this case, the heuristics may be utilized to determine the most utilized and/or the most useful and/or the shortest-lived values to store in the register file cache 204.

In one embodiment, the use of registers may be utilized to determine the data to be written to the register file cache 204. For example, a heuristic may be utilized to predict the future usefulness of individual registers. In this case, the heuristic may access a list of predicted future accesses and may rely on a metric of usefulness that uses past event information to predict future usefulness of individual registers.

In some cases, the distribution of lifetimes of all values produced during the execution of a computer program (e.g. a software application, computer code, etc.) may be very lopsided, where most values only live a short time and a long tail of values persist through large parts of a lifetime of a program. This may be the case in a variety of processor applications including general CPU programs and graphics processing unit (GPU) shaders. In addition to the lopsided distribution, many values may be consumed shortly after they are produced.

In one embodiment, a structure may be utilized to separately deal with short-lived values and long-lived values. For example, a first cache (e.g. a "nursery cache," etc.) may be used for cache holding all young values. Additionally, a second cache (e.g. a "persistent" cache, etc.) may be used to hold values that have surpassed a certain age.

As an option, the cache for storing the short-lived values (e.g. a hardware nursery cache, etc.) may use the knowledge of the global distribution of value lifetimes and consumption patterns to optimize the hit rate of the cache. By caching only recently produced values, the cache for storing the short-lived values may capture a large fraction of read and write traffic to and from the register file 202.

Figure 3:
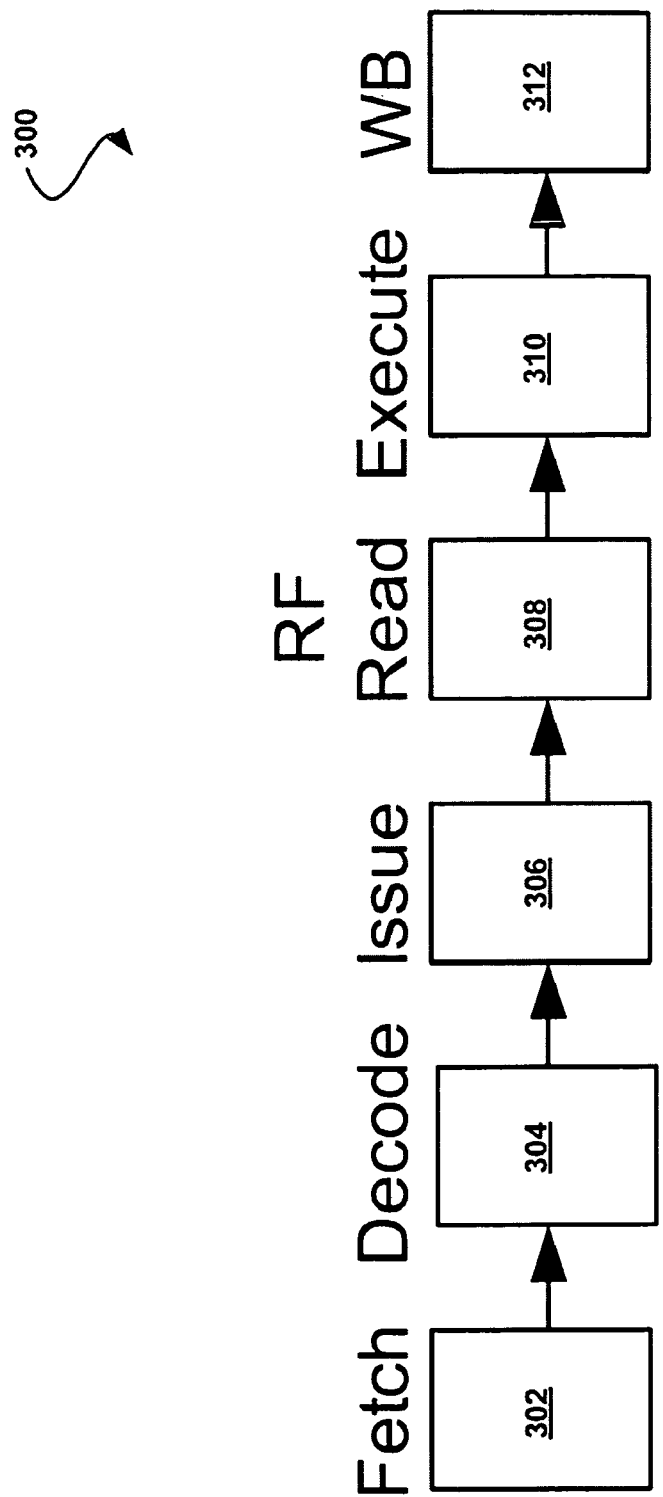
FIG. 3 shows a processor pipeline system, in accordance with one embodiment.

FIG. 3 shows a processor pipeline system 300, in accordance with one embodiment. As an option, the present system 300 may be implemented in the context of the functionality and architecture of FIGS. 1-2. Of course, however, the present system 300 may be implemented in any desired environment. Again, the aforementioned definitions may apply during the present description.

As shown, the graphics pipeline 300 includes various pipeline stages 302-312. Each of the pipeline stages 302-312 are capable of running short programs called shaders. In the context of the present description, a shader refers to a computer program or code associated with one or more processing stages implemented by a processor.

In this case, each of the pipeline stages 302-312 may execute its respective shader with the input to the shader being the output from a previous stage. The output of the shader may then be passed as an input to a subsequent pipeline stage. The shaders included in each of the pipeline stages 302-312 may include short programs (e.g. tens to hundreds of instructions, etc.) that execute floating point operations. Some or all of the shaders from one or more stages may execute concurrently as multiple threads on a single processor or on separate processors.

Regardless of whether a processor is time-multiplexed among multiple threads, in operation, a processor implementing the processor pipeline 300 may fetch an instruction from any ready thread as part of a fetch stage 302. The processor may then decode the instruction as part of a decode stage 304. Based on the decoded instruction, the processor may determine whether data is to be retrieved from a register file cache or a register.

Furthermore, the processor may be capable of determining whether data is to be written to the register file cache or the register file, based on the decoded instruction. In one embodiment, the issue stage 306 may include functionality and/or structures to facilitate the determination whether the data is to be written to or retrieved from the register file cache or the register. For example, a data structure may be utilized for tracking whether data is to be stored in the register file cache or the register file. As an option, the data structure may include a lookup table.

Figure 4:
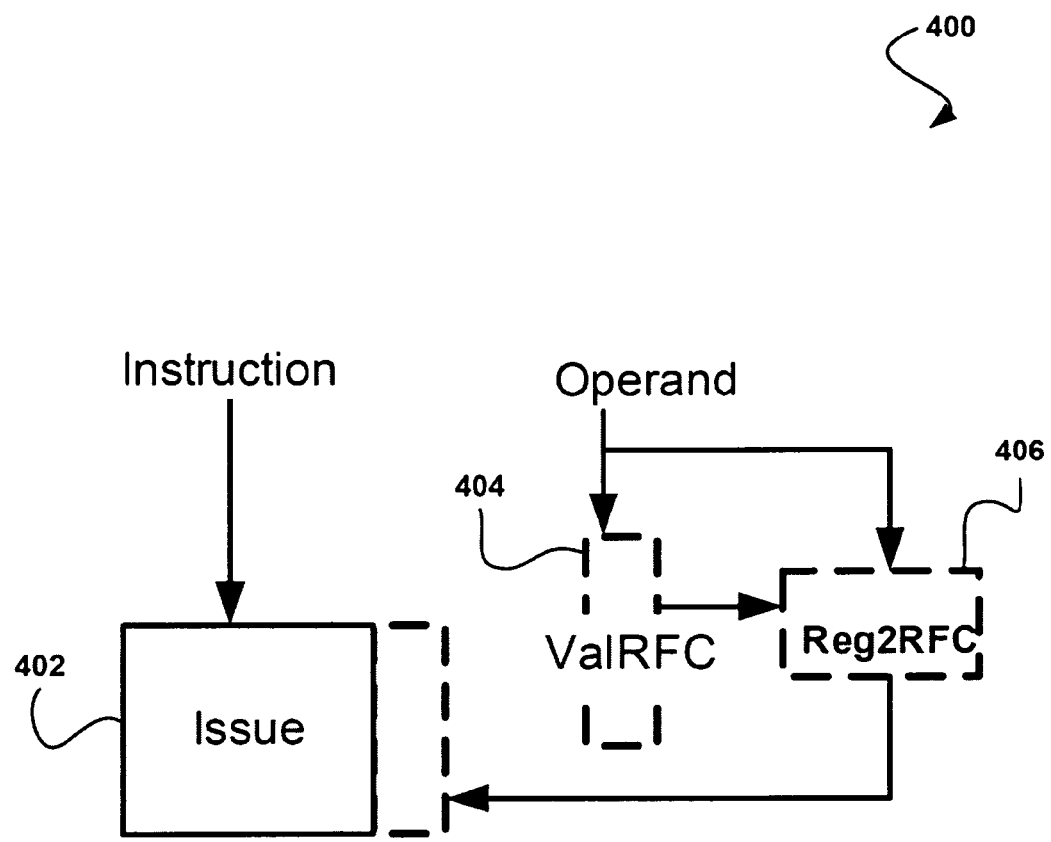
FIG. 4 shows a system for implementing a register file cache, in accordance with one embodiment.

FIG. 4 shows a system 400 for implementing a control structure for a register file cache, in accordance with one embodiment. As an option, the present system 400 may be implemented in the context of the functionality and architecture of FIGS. 1-3. Of course, however, the present system 400 may be implemented in any desired environment. Further, the aforementioned definitions may apply during the present description.

As shown, an issue stage 402 is in communication with a first buffer structure 404 (e.g. RAM with register entries, etc.). Additionally, the issue stage 402 is in communication with a second buffer structure 406 (e.g. CAM/RAM with register file cache slot entries, etc.). In one embodiment, the issue stage 402 may represent the issue stage 306 as shown in the graphics pipeline system 300 in FIG. 3.

In operation, when an instruction is ready to issue, it is determined whether any input operands of the instruction are being stored in a register file cache. If it is determined that at least one of the input operands of the instruction are being stored in the register file cache, positions of the operands in the register file cache are determined.

In one embodiment, a lookup table (e.g. the ValRFC table) stored in the first buffer structure 404 may be accessed during the issue stage. As an option, this lookup table may include one bit per register (e.g. an "in_rfc" bit, etc.) that indicates whether the most recent write to that register is cached in the register file cache. The second buffer structure 406 is a fully associative buffer (e.g. called "Reg2RFC") that may map a register number as named by the compiler to a register file cache entry.

The second buffer structure 406 may have at least as many entries as there are in the register file cache. Instructions may index a data structure stored in the second buffer structure 406 with input operand register numbers of the instruction. In this case, the instructions may index the second buffer structure 406 in parallel to checking the lookup table, or after the result from a lookup in the lookup table is determined. If the operand is marked in the lookup table as being in the register file cache, the result of the second buffer structure 406 lookup may be stored in new fields in a scoreboard entry of the instructions.

During a register file read stage (e.g. the RF read stage 308 shown in FIG. 3, etc.), the register file cache may be accessed in parallel to the main register file. As an option, a set of multiplexers may be utilized for an output of the main register file and the register file cache.

When instructions enter an execute stage (e.g. the execute stage 310 as shown in FIG. 3), or the issue stage (if register read latency is deterministic), or even the decode (if the processor uses no scoreboarding and only in-order issue), depending on the pipeline organization of the processor, it may be determined into which slot in the register file cache the instructions will write their result. It may also be determined whether the instructions have to write back any value to the main register file or whether a previous version of the same register may be overwritten. To accomplish this, the instructions may read entries in the lookup table and entries in the second buffer structure 406 using an output operand of the instruction.

If the lookup of the lookup table indicates that the output operand is already in the register file cache, the slot number read from the second buffer structure 406 may be used in the writeback stage (e.g. the writeback stage 312 of FIG. 3, etc.). If the lookup in the lookup table indicates that the output register is not in the register file cache, the register file cache entry marked for replacement may be read from the second buffer structure 406 and the register ID of the register that is being evicted may be sent to the lookup table to be marked as no longer being in the register file cache.

It should be noted that, in one embodiment, a GPU (or any other processor with long latency operations) being utilized may have a large number of threads active simultaneously to cover the latency of reading values from off-chip memory (or other causes for long latency operations, such as contention for shared resources, etc.). At any given point in time, only a small subset of these threads may not be waiting on a read from off-chip memory (or other causes for long latency operations, such as contention for shared resources, etc.). As an option, this distribution between waiting and active threads may be exploited to share the different per thread register file caches between threads. In this way, active threads may use more register file cache entries, where values from waiting threads are naturally evicted from the shared register file cache.

In some cases, using a single thread-shared register file cache instead of multiple smaller thread-private register file caches may offer a better hit-rate at a given size or an equivalent hit-rate with a reduced overall size. In these cases, the size of the savings by using a single thread-shared register file cache instead of multiple thread-private register file caches may be determined utilizing a ratio of the average number of active threads "A" to the total number of threads in the processor "T."

As an option, a thread-shared register file cache may be sized to offer acceptable hit-rates for "A" threads, while the overall size of thread-private register file caches may correspond to "T." As the number of threads "T" in a processor is increased to cover for the growing latency of external memory (or other causes for long latency operations, such as contention for shared resources, etc.), the ratio "T/A" grows, along with the efficiency of a thread-shared register file cache. In one embodiment, a thread-shared register file cache may be implemented such that, if multiple programs are executing at the same time, with some programs utilizing a smaller number of registers than others, the thread-shared register file cache may use more slots for those programs that use a larger number of registers.

In some cases, a thread-shared register file cache may maintain a global replacement list of register file cache entries shared between all threads in a processor. As an option, threads may be allocated register file cache slots based on a global policy and the number of slots for each slot may vary from cycle to cycle. In various embodiments, the policy may include a static thread prioritization policy, a policy based on a number of memory requests outstanding, a first come, first serve policy, and/or any other policy.

Thus, the register file cache may only be utilized by one of a plurality of threads at a time, a subset of a plurality of threads, or the register file cache may simultaneously be utilized by each of a plurality of threads. Furthermore, the register file cache may be allocated amongst each of the plurality of threads based on the policy. In this case, the policy may dictate a number of registers of the register file cache that are allocated to each of the plurality of threads.

In this way, a register file cache may be implemented in the context of a highly multithreaded processor such that a majority of reads and a large fraction of writes bypass accessing a large main register file in favor of the much smaller register file cache. Additionally, the typical behavior of threads running on a highly multithreaded processor may be exploited to share the register file cache between threads and reduce the size of the register file cache. Furthermore, a thread-private register file cache may be utilized for an in-order processor without implementing any renaming and may be capable of handling architected registers being overwritten while the value for that register is still in the register file cache.

Figure 5:
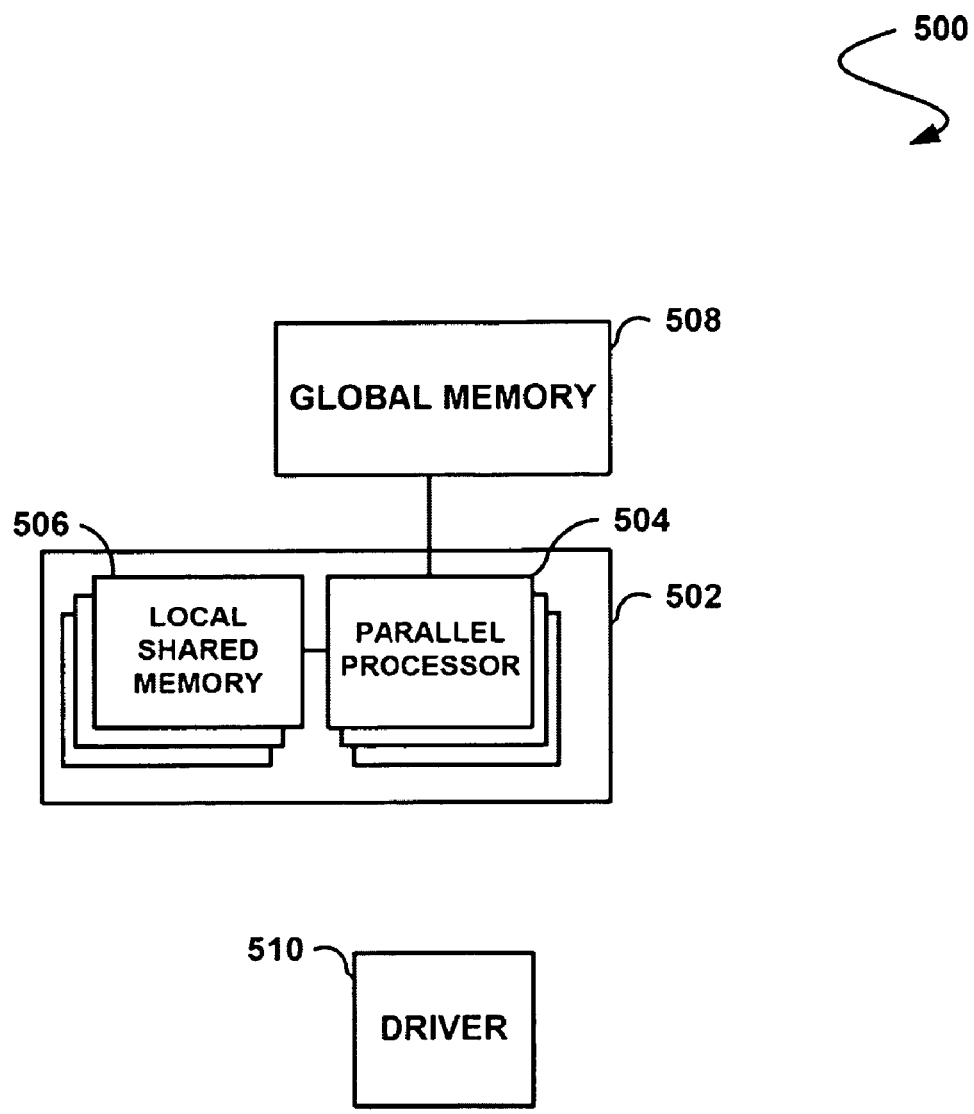
FIG. 5 shows a system for simultaneously processing a plurality of threads, in accordance with another embodiment.

FIG. 5 shows a system 500 for simultaneously processing a plurality of threads, in accordance with another embodiment. As an option, the present system 500 may be implemented in the context of the functionality and architecture of FIGS. 1-4. Of course, however, the present system 500 may be implemented in any desired environment. Once again, the aforementioned definitions may apply during the present description.

As shown, a parallel processing architecture 502 is provided. Such parallel processing architecture 502 includes a plurality of parallel processors 504. While not shown, such parallel processors 504 may be capable of operating on a predetermined number of threads. To this end, each of the parallel processors 504 may operate in parallel, while the corresponding threads may also operate in parallel.

In one embodiment, the parallel processing architecture 502 may include a SIM D architecture. In such a system, the threads being executed by the processor are collected into groups such that, at any instant in time, all threads within a single group are executing precisely the same instruction but on potentially different data.

In another embodiment, the foregoing parallel processing architecture 502 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 502 may include a processor with one or more vector processing elements such as the Cell processor, referring to the Cell Broadband Engine microprocessor architecture jointly developed by Sony®, Toshiba®, and IBM®.

With continuing reference to FIG. 5, the parallel processing architecture 502 includes local shared memory 506. Each of the parallel processors 504 of the parallel processing architecture 502 may read and/or write to its own local shared memory 506. This shared memory 506 may consist of physically separate memories associated with each processor or it may consist of separately allocated regions of one or more memories shared amongst the processors 504. Further, in the illustrated embodiment, the shared memory 506 may be embodied on an integrated circuit on which the processors 504 of the parallel processing architecture 502 are embodied. Further, the shared memory may be allocated and accessed explicitly as using specialized instructions by software as a separate memory space, or allocated and accessed implicitly by hardware as a cache of a common memory space.

Still yet, global memory 508 is shown to be included. In use, such global memory 508 is accessible to all the processors 504 of the parallel processing architecture 502. As shown, such global memory 508 may be embodied on an integrated circuit that is separate from the integrated circuit on which the processors 504 of the aforementioned parallel processing architecture 502 are embodied. While the parallel processing architecture 502 is shown to be embodied on the various integrated circuits of FIG. 5 in a specific manner, it should be noted that the system components may or may not be embodied on the same integrated circuit, as desired. Further, subsets of the global memory may be cached on the same integrated circuit as the processors, either in a shared cache or in per-processor caches.

Still yet, the present system 500 of FIG. 5 may further include a driver 510 for controlling the parallel processing architecture 502, as desired. In one embodiment, the driver 510 may include a library, for facilitating such control. For example, such library 510 may include a library call that may instantiate the functionality set forth herein.

Further, in another embodiment, the driver 510 may be capable of providing general computational capabilities utilizing the parallel processing architecture 502 (e.g. a graphics processor, etc.). An example of such a driver may be provided in conjunction with the CUDA™ framework provided by NVIDIA Corporation. In use, the driver 510 may be used to control the parallel processing architecture 502 to simultaneously processing a plurality of threads utilizing a register file cache, as described above.

Figure 6:
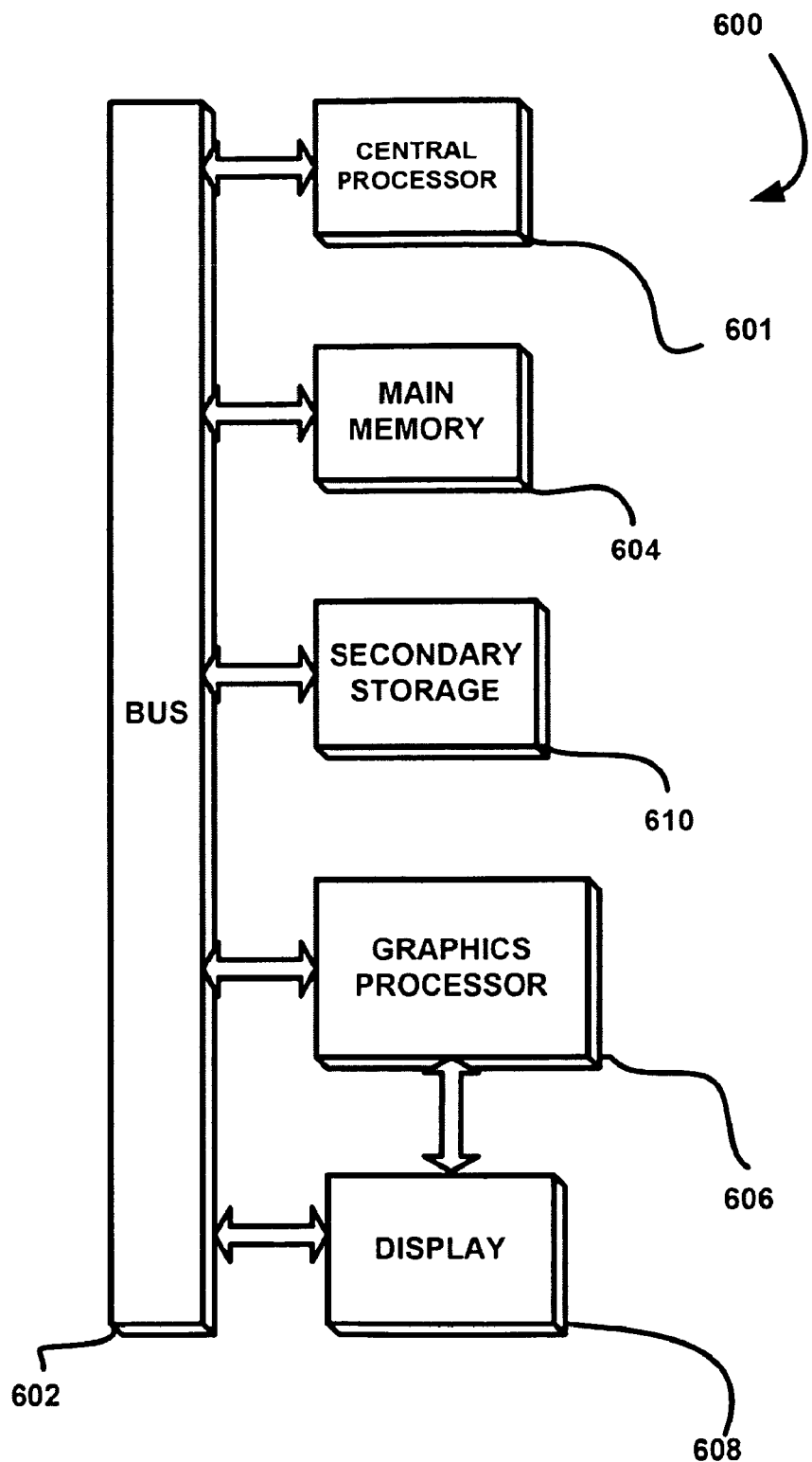
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a processor capable of simultaneously processing a plurality of threads, the processor including:
a register file, and
a register file cache in communication with the register file;
wherein the processor is operable to: store first data in the register file cache or bypass the register file cache and write to the register file, copy the first data from the register file cache to the register file, retrieve the first data from the register file, store second data in the register file cache, retrieve the second data from the register file cache, and delete the second data from the register file cache before the second data is copied from the register file cache to the register file;
wherein the register file cache is simultaneously utilized by each of the plurality of threads;
wherein the register file cache is allocated amongst each of the plurality of threads based on a policy that dictates a number of registers of the register file cache that are allocated to each of the plurality of threads.

2. The apparatus of claim 1, wherein the processor is operable to store and retrieve data in the register file cache in lieu of the register file.

3. The apparatus of claim 1, further comprising a cache that includes a persistent cache which stores data with a lifetime greater than a predetermined amount.

4. The apparatus of claim 1, and further comprising a data structure for tracking whether data is stored in the register file cache or the register file.

5. The apparatus of claim 4, wherein the data structure includes a lookup table.

6. The apparatus of claim 1, wherein the register file cache is only utilized by one of the plurality of threads at a time, or each thread utilizes a separate register file cache.

7. The apparatus of claim 1, wherein the processor remains in communication with memory and a display via a bus.

8. The apparatus of claim 1, and further comprising a fully associative buffer for mapping a register number to a register file cache entry, wherein the fully associative buffer has as many entries as there are in the register file cache.

9. The apparatus of claim 8, wherein at least one instruction indexes the fully associative buffer with at least one input operand register number of the instruction.

10. The apparatus of claim 1, wherein a nursery cache captures a large fraction of read and write traffic to and from the register file by storing only data with a lifetime less than or equal to a predetermined amount.

11. The apparatus of claim 1, wherein data is stored in the register file cache based on heuristics.

12. The apparatus of claim 1, wherein the processor is capable of fetching an instruction, decoding the instruction, and determining whether data is to be retrieved from the register file cache or the register file, based on the decoded instruction.

13. The apparatus of claim 12, wherein the processor is capable of determining whether data is to be written to the register file cache or the register file, based on the decoded instruction.

14. The apparatus of claim 1, wherein the processor includes a graphics processor.

15. The apparatus of claim 1, wherein the processor includes a parallel general-purpose processor architecture.

16. The apparatus of claim 1, wherein the processor includes a graphics processor and one or more CPUs on the same chip.

17. The apparatus of claim 1, wherein the processor includes a signal processor.

18. The apparatus of claim 1, wherein the processor includes a network processor.

19. A computer program product embodied on a computer readable medium, comprising:
   computer code for processing a plurality of threads utilizing a processor including a register file and a register file cache in communication with the register file;
   wherein the processor is operable to: store first data in the register file cache or bypass the register file cache and write to the register file, copy the first data from the register file cache to the register file, retrieve the first data from the register file, store second data in the register file cache, retrieve the second data from the register file cache, and delete the second data from the register file cache before the second data is copied from the register file cache to the register file;
   wherein the register file cache is simultaneously utilized by each of the plurality of threads;
   wherein the register file cache is allocated amongst each of the plurality of threads based on a policy that dictates a number of registers of the register file cache that are allocated to each of the plurality of threads.

20. A method, comprising:
processing a plurality of threads utilizing a processor including a register file and a register file cache in communication with the register file;
wherein the processor is operable to: store first data in the register file cache or bypass the register file cache and write to the register file, copy the first data from the register file cache to the register file, retrieve the first data from the register file, store second data in the register file cache, retrieve the second data from the register file cache, and delete the second data from the register file cache before the second data is copied from the register file cache to the register file;
wherein the register file cache is simultaneously utilized by each of the plurality of threads;
wherein the register file cache is allocated amongst each of the plurality of threads based on a policy that dictates a number of registers of the register file cache that are allocated to each of the plurality of threads.

* * * * *